(12) United States Patent
Branca

(10) Patent No.: US 6,591,942 B2
(45) Date of Patent: Jul. 15, 2003

(54) PROCESS FOR MANUFACTURING A COMPOSITE MATERIAL LADDER AND LADDER OBTAINED WITH SAID PROCESS

(75) Inventor: Alfonso Branca, Milan (IT)

(73) Assignee: Top Glass S.p.A., Pioltello (IT)

( * ) Notice: Subject to any disclaimer, the term of this patent is extended or adjusted under 35 U.S.C. 154(b) by 0 days.

(21) Appl. No.: 09/844,536

(22) Filed: Apr. 27, 2001

(65) Prior Publication Data

US 2002/0003062 A1 Jan. 10, 2002

(30) Foreign Application Priority Data

Jul. 10, 2000 (EP) ............................................ 00830483

(51) Int. Cl.$^7$ ................................................ E06C 7/00
(52) U.S. Cl. ..................... 182/228.1; 182/46; 182/228.6
(58) Field of Search ........................... 182/228.1, 228.6, 182/46

(56) References Cited

U.S. PATENT DOCUMENTS

| 2,885,132 | A | * | 5/1959 | Campbell |
| 2,932,358 | A | * | 4/1960 | Hopfeld |
| 5,361,483 | A | * | 11/1994 | Rainville |
| 5,366,253 | A | * | 11/1994 | Nakashiba |

FOREIGN PATENT DOCUMENTS

| DE | 2927 257 A | | 1/1981 |
| DE | 196 38 715 | | 4/1997 |
| GB | 1 203 572 A | | 8/1970 |
| GB | 2065211 | * | 6/1981 |

* cited by examiner

Primary Examiner—Alvin Chin-Shue
(74) Attorney, Agent, or Firm—Pearne & Gordon LLP

(57) ABSTRACT

A process for manufacturing ladders comprises the following steps: arranging a plurality of rungs (2) of a material comprising a plurality of reinforcing fibers (2a) associated with a binding resin (2b) and each having at least one coupling portion (2c); arranging at least one primary upright length (3), preferably of a material comprising a plurality of reinforcing fibers (3a) associated with a binding resin (3b); mechanically linking the coupling portions (2c) of the rungs (2) to corresponding engagement regions (3c) of the primary upright length (3). The linking step involves bringing at least one of the binding resins (2b, 3b) to the fluid phase at least close to the engagement regions (3c) and/or the coupling portions (2c). The binding resins (2b, 3b) are thermoplastic polymeric materials and the step of bringing the binding resins (2b, 3b) to the fluid phase takes place by melting of the binding resins (2b, 3b). The binding resins (2b, 3b) are chemically similar to each other and they are preferably identical with each other.

24 Claims, 3 Drawing Sheets

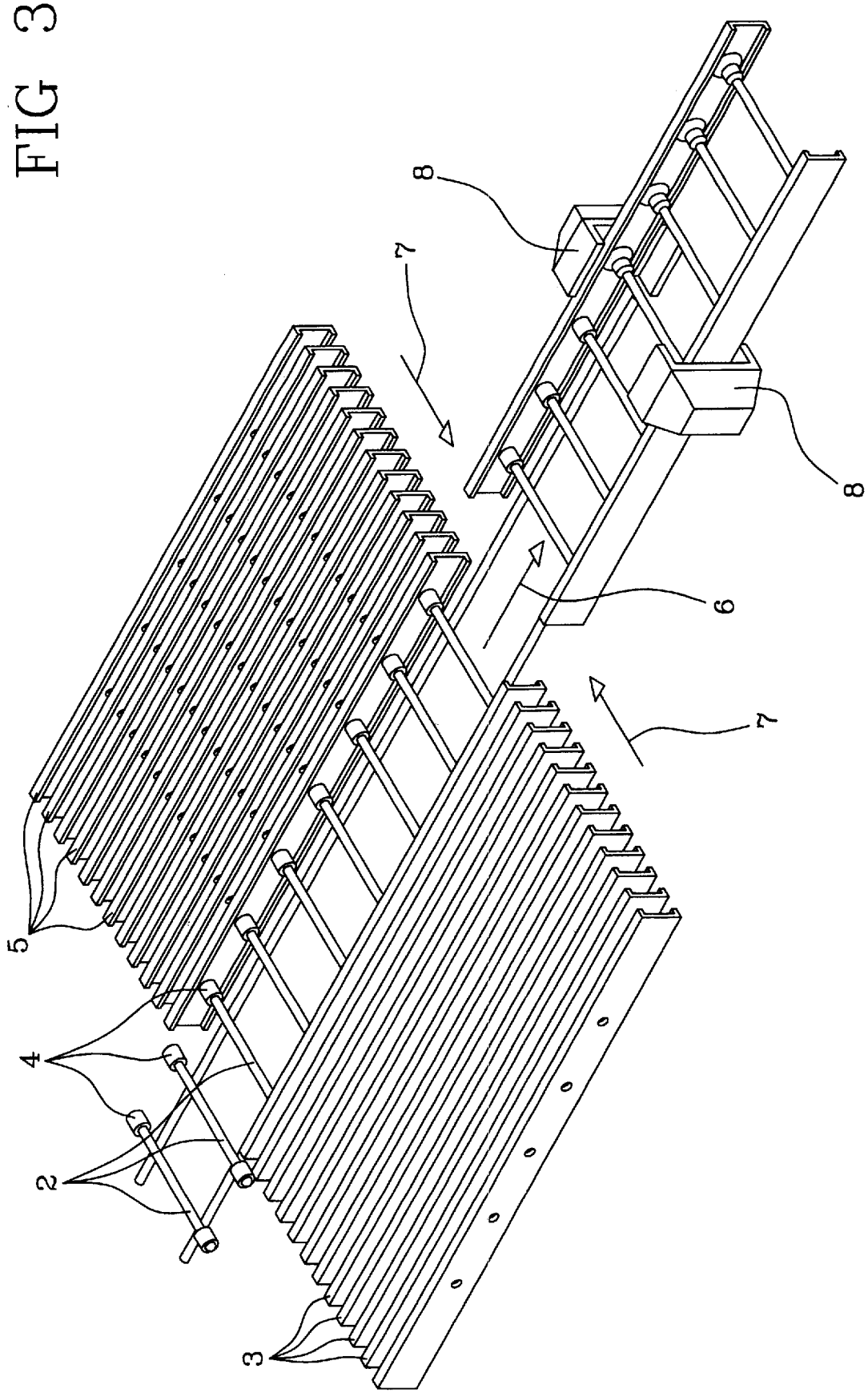

PROCESS FOR MANUFACTURING A COMPOSITE MATERIAL LADDER AND LADDER OBTAINED WITH SAID PROCESS

FIELD AND BACKGROUND OF THE INVENTION

The present invention relates to a process for manufacturing a ladder of composite material, as well as the ladder obtained by said process.

It is known that recently composite materials have revolutionized construction and production technologies due to their high mechanical characteristics together with their intrinsic lightness in weight (as compared with metal materials, for example).

Application of composite materials in different technical fields is still subject to intense research and development efforts, taking into account the very wide number of composite materials that can be defined and employed in the most varied constructions.

Generally, composite materials are differentiated from each other based on the typology of the reinforcing fibers and/or the resins used as binding agents between said fibers; in more detail, it is to be noted that, for manufacturing (extruded or pultruded) section members, the employed resins are generally made of polymeric substances.

Usually, the polymeric substances employed in pultrusion processes as binding resins (for impregnation of the resistant fibers) are of the thermosetting type, i.e. they have a chemical structure that, once polymerized, if exposed to high temperatures, is submitted to an irreversible decay as regards its structure (it carbonizes, for example).

A particular application field for composite materials is found in ladder manufacture; in this production sector, the main components of a ladder (one or two upright lengths and a plurality of rungs) are usually made separately, by forming or molding for example, and they are subsequently assembled.

As far as rungs and upright lengths are concerned, different typologies are adopted by the known art which substantially aim at obtaining a rung-upright length link which can be easily disassembled and has a certain degree of stability, in view of a heavy use of the ladder. In other words, in making ladders of composite material, apart from the structural efficiency of the individual constituent elements, a very important role from the point of view of quality of the finished product and the manufacturing costs is performed by the technical and operating modalities for rung-upright length assembling.

For assembling upright lengths and rungs, the construction solutions of known type may involve the presence of one or more gluing areas or the existence of elements interposed between the rungs and the upright lengths; in other words, the known art teaches from a technical point of view how to indirectly connect rungs and upright lengths, i.e. it envisages that transmission of the mechanical actions and maintenance of the relative positions between these components should rely on an appropriate third construction element (which may be a suitably added adhesive material or a true junction element).

Although known solutions are widespread, it is to be pointed out that the above described known art has some drawbacks.

In fact, due to the necessity to use the mentioned interconnecting element, the production processes become more complicated, which will bring about an increase in the operating time.

Typically, suitably shaped seatings and coupling regions are to be created on the upright lengths and/or the rungs and these regions may be critical areas for starting of sudden yielding or yielding propagating in time within the material.

Furthermore, addition of a supplementary element to the connecting region between rungs and upright lengths (which element generally has physico-chemical characteristics different from those of the other constituent elements in ladders) gives rise to a generally heterogeneous article, having hardly-predictable problems in terms of dynamic behavior and thermal deformation.

In addition, a drawback directly affecting the operating times and costs is given by the fact that thermosetting resins have some working problems, exactly because they are exposed to particular work conditions (specifically, very hot heat sources); this adversely affects the structural integrity of the ladder, since the binding resin does not fully carry out packing of the mechanically resistant fibers and can give rise to breaking, separation or presence of intolerable backlashes between rungs and upright lengths.

SUMMARY OF THE INVENTION

In the light of the above, it is a fundamental aim of the present invention to manufacture a ladder of composite material capable of substantially eliminating the above discussed drawbacks.

In particular, it is an object of the present invention to provide a process for manufacturing ladders of composite material adapted to greatly reduce the manufacturing difficulties, with clear benefits in terms of time and production economy.

In addition, the present invention aims at devising a production process capable of manufacturing a ladder of simplified structure, which at the same time has excellent solidity and steadiness features.

It is a further object of the invention to provide a production process enabling manufacture of a ladder of composite material without running into the mentioned working problems typical of thermosetting resins, and in particular capable of avoiding decay of the binding resin during possible exposures to high temperatures.

BRIEF DESCRIPTION OF THE DRAWINGS

Further features and advantages will become more apparent from the detailed description of a preferred but not-exclusive embodiment of a ladder of composite material in accordance with the present invention. This description will be given hereinafter with reference to the accompanying drawings taken by way of non-limiting example, in which:

FIG. 3 is a general perspective view of an implementation line of the process in accordance with the invention.

DESCRIPTION OF THE PREFERRED EMBODIMENTS

Figure 1:
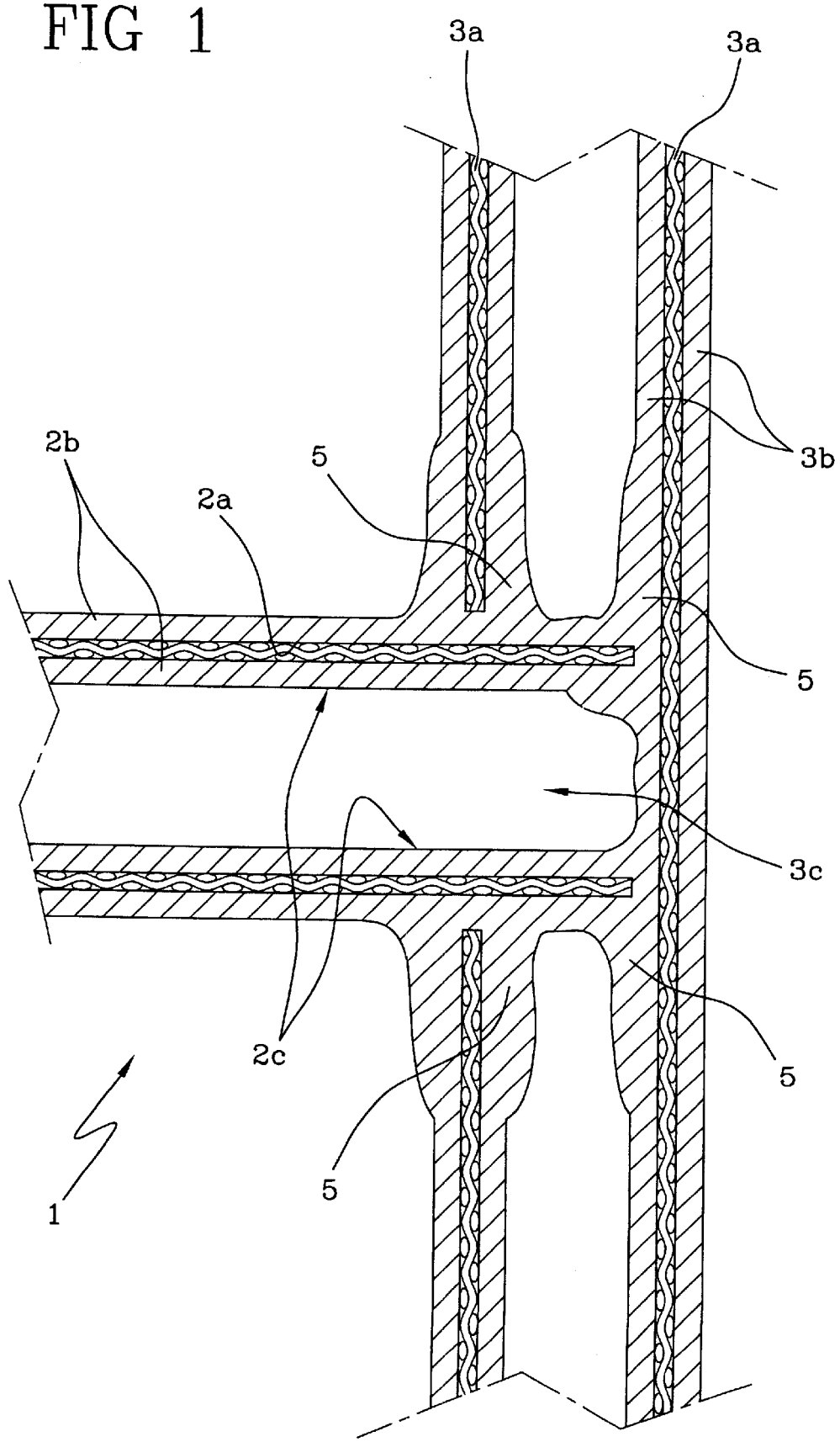
FIG. 1 is a diagrammatic plan view of a detail of the ladder obtained by the process of the present invention.
Figure 2:
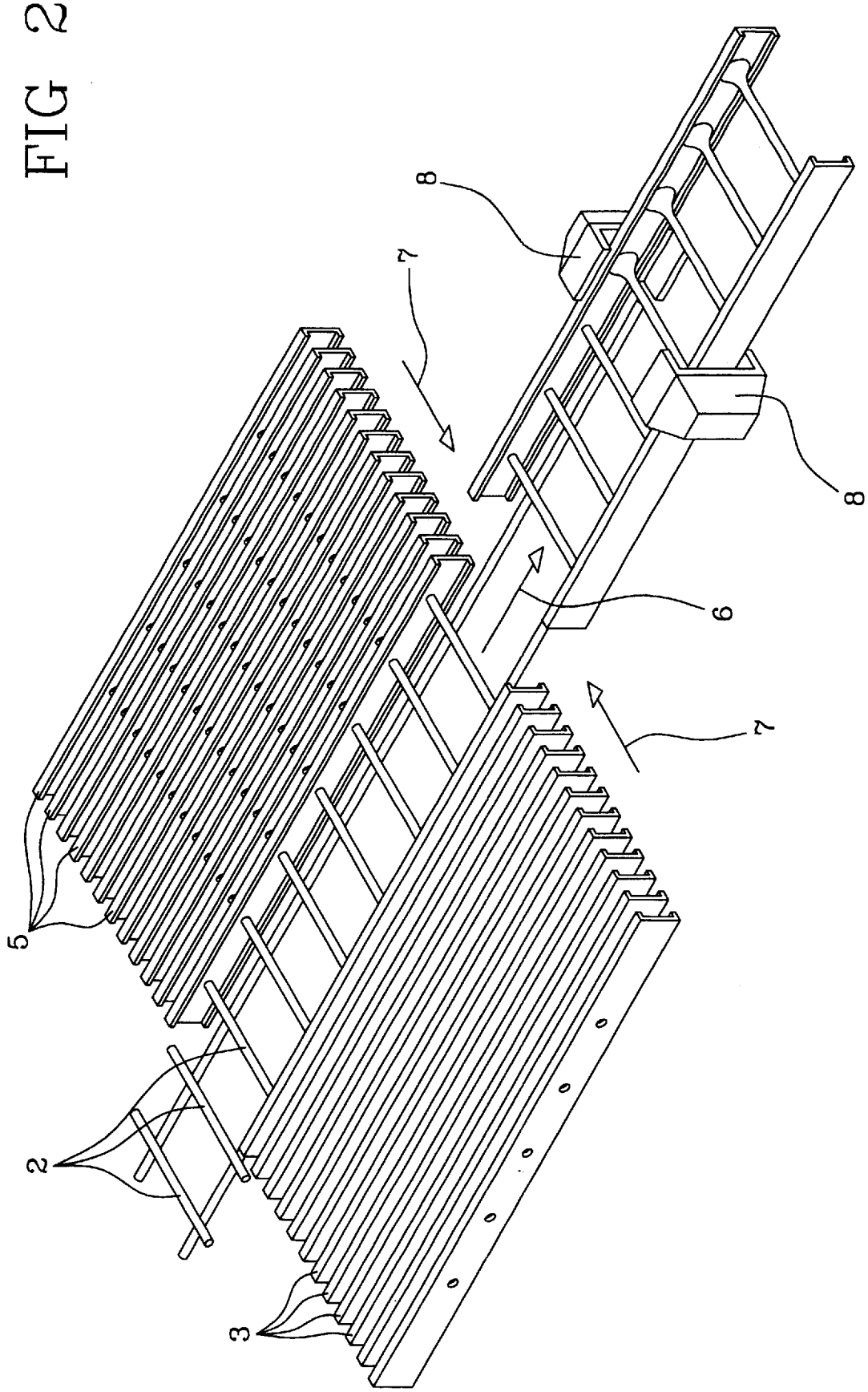
FIG. 2 is a general perspective view of an implementation line of the process of the invention.

With reference to the drawings, a ladder of composite material in accordance with the present invention has been generally identified by reference numeral 1.

The process to manufacture such a ladder 1 begins with arrangement of a plurality of rungs 2; conveniently these rungs 2 will be preferably made of a composite material in which there is a plurality of reinforcing fibers 2a (disposed in different configurations depending on the planning charges and the desired elasticity) associated with a binding resin 2b. Should the planning requirements allow it, rungs could also be manufactured through exclusive use of plastic and preferably thermoplastic material, without the presence of any reinforcing fibre.

The process of the present invention further provides for arrangement of at least one primary upright length 3, made of composite material as well, which comprises a plurality of reinforcing fibers 3a (in turn associated with a binding resin 3b) ; a plurality of engagement regions 3c intended to receive rungs 2 is advantageously provided on the primary upright length 3. In particular, it is to be noted that rungs 2 generally have at least one coupling portion 2c the shape of which essentially matches that of the engagement regions 3c; the shape of the coupling portion 2c obviously depends on whether these engagement regions 3c are mere areas on the upright length surface or consist of complicated structures (such as coupling seatings formed in the side of the primary upright length 3, through drilling or punching for example).

Ladder 1 is obtained by linking of rungs 2 to the primary upright length 3 which is the only element disposed in a vertical direction during the ladder use conditions (and therefore the only element discharging the user's weight onto the ground). In this case, rungs 2 are mounted centrally of the upright length 3; consequently, the coupling portions 2c are substantially positioned close to the center line of rungs 2.

At all events, by the process of the present invention an alternative embodiment of ladder 1 can be conceived, i.e. a ladder resting on the ground by means of two upright lengths, generally parallel to each other or disposed in a converging direction from bottom to top (for a steady support). In this case a secondary upright length 5 is provided which obviously is made of composite material (i.e. comprising a plurality of reinforcing fibers 5a associated with a binding resin 5b).

Conveniently, the secondary upright length 5 too has a plurality of engagement regions 5c, the function of which is substantially the same as that of the engagement regions formed in the primary upright length 3.

The ladder provided with two upright lengths is obviously manufactured in such a manner that rungs 2 extend transversely between the primary upright length 3 and the secondary upright length 5; to achieve this architecture, rungs 2 in this case have two coupling portions 2c opposite to each other. Obviously, rungs 2 (that are mounted in a transverse direction and preferably perpendicular to the primary and secondary upright lengths 3 and 5), are mounted parallel to each other with respect to the two upright lengths 3 and 5 and are mechanically linked to the primary upright length 3 and the secondary upright length 5 through each of the two opposite coupling portions 2c.

Conveniently, the secondary upright length 5 is generally oriented in a transverse direction, which can be parallel or convergent with respect to the primary upright length 3 (but generally coplanarity of the two upright lengths is maintained).

After arranging the appropriate number of rungs 2 and upright lengths, the process in accordance with the present invention involves the step of mechanically linking these components so as to obtain the finished article; advantageously, the step of mechanically linking rungs 2 to the upright lengths 3 and/or 5 (depending on the type of ladder to be obtained) is carried out by bringing the binding resins 2b (of rungs 2) and the binding resins of the upright lengths 3b and/or 5b to the fluid phase.

In accordance with the present invention, achievement of the fluid phase is obtained by melting of the binding resins; in particular, the area concerned with accomplishment of the melting process is that defined in a series of regions each including the coupling portion 2c and the engagement portions 3c and/or 5c (in other words, melting takes place close to the engagement regions 3c, 5c and/or the coupling portions 2c)

Conveniently, melting of the binding resins is carried out close to the coupling portions and the engagement regions 2c, 3c and/or 5c in order not to run the risk that undesirable separations of the binding resin from the reinforcing fibers should occur at critical regions such as the resting plane of the rungs or the upright length portions relatively far from the engagement regions, for example.

Advantageously, to enable accomplishment of such a procedure, the binding resins 2b, 3b and/or 5b are thermoplastic polymeric materials that are capable of withstanding reversible changes in their aggregation state and that do not alter their physico-mechanical properties once they have reached a solid state again.

It is to be noted that the binding resins 2b, 3b and/or 5b are selected so as to be chemically similar to each other, in order to promote mixing of same and possibly give rise to chemical reactions forming bonds (of the "hydrogen" or "Van der Waals" type, for example) which help in strengthening the mechanical link between rungs 2 and the upright lengths 3 and/or 5.

It should be pointed out that in the fluid mass made up of the liquefied resins, an intimate mixing of the binding resins is advantageously obtained by utilizing the natural convection combined with the effects of the force of gravity to which the binding resins are submitted during residence of same in a fluid phase; if required (if viscosities of the resins were particularly high, for example) the process in accordance with the present invention can involve an operating step of producing mixing in the fluid mass made up of resins 2b, 3b and/or 5b, by localized shaking for example.

In particular, in the light of the above and in order to increase productivity of the process of the invention, the binding resins 2b, 3b and 5b are chemically identical substances; in this way, a perfect chemical compatibility at the moment of melting is ensured (and above all at the moment of subsequent recovery of the solid aggregation state).

In accordance with the present invention, subsequently to the sub-step of bringing at least one of the binding resins 2b, 3b and/or 5b to the fluid phase, the process goes on with a step of consolidating the binding resins; by virtue of this consolidation, the mechanical link between the components of ladder 1 is obtained.

In carrying out this step, which can be advantageously conducted by merely letting the region concerned with the liquefaction process become cold, an agglomerate of solidified thermoplastic resin 5 is formed which keeps rungs 2 and the primary upright length 3 (or both the primary and secondary upright lengths 3, 5 depending on the type of ladder to be made) in a mutual-link configuration.

Advantageously, such an assembling procedure brings to definition of a link between rungs 2 and upright lengths 3, 5 that practically is not perceptible when the manufacturing process has been completed, because liquefaction of the binding resins takes place at a finished portion of ladder 1 that remains at the inside and therefore cannot be seen by or is not accessible to the user of the finished product. In this connection it should be pointed out that possible excess materials and/or any external pouring of material can be easily eliminated, by localized heating and subsequent smoothing and leveling, for example (or more generally by removal of the excess resin).

The present production process can be advantageously supplemented with an alternative embodiment concerning carrying out of the step of mechanically linking rungs 2 to the upright lengths 3 and/or 5; this alternative procedure is particularly useful if a very strong link is wished to be ensured and/or a link having extended dimensions within ladder 1 (typically, if particularly large ladders are to be obtained, or ladders planned to support important weights).

In accordance with the above description, the mechanical link between a rung and an upright length 3 is obtained by first arranging a cast body 4 of thermoplastic polymeric material at an engagement region 3c and/or a coupling portion 2c (at will, depending on current requirements).

This cast body 4 is made of a thermoplastic polymeric material preferably chemically similar to the binding resins 2c, 3c and/or 5c and more preferably identical with said resins, for the same reasons of physico-chemical affinity and production economy as above. Conveniently, the shape of the cast body 4 substantially matches that of the engagement region 3c or the coupling portion 2c; generally it is to be noted that this cast body 4 can have any shape, to be positioned either inside the engagement region 3c/5c or around the coupling portion 2c.

In particular, in accordance with the present invention the shape of the cast body 4 substantially matches that of the coupling portion 2c or the engagement region 3c/5c, so as to facilitate the setting operations.

At this point the coupling portion 2c is inserted in the engagement region 3c, taking care to position these two elements close to the cast body 4; in other words, the cast body 4 is at least partly interposed between the seating and the coupling portion.

Advantageously, the binding resin 2b of rung 2 is liquefied together with the binding resin 3b (or 5b) and above all together with the cast body 4, thereby obtaining a predetermined amount of thermoplastic fluid-phase material; subsequently this fluid-phase plastic material is solidified to form the already mentioned agglomerate of solid thermoplastic resin 5.

As regards the just-described operating variant, it is to be noted that contribution of the cast body 4 essentially consists in supplying the thermoplastic resin surplus necessary to extend the agglomerate 5 dimensions, in order to distribute the mechanical stresses resulting from use of ladder 1 over a wider volume so that the breaking points of agglomerate 5 are reached with more difficulty (which, in conclusion, will increase the structural coherence of ladder 1).

In accordance with the present invention, the operating sequence leading to arrangement of a rung 2 is substantially organized with the following sub-steps: first an elongated body of thermoplastic resin 2b incorporating reinforcing fibers 2a is made (generally by forming, preferably by pultrusion or extrusion); then the elongated body is cut to preestablished lengths, so as to obtain a predetermined amount of rungs 2 each having at least one coupling portion 2c (obviously, if a ladder having two upright lengths is concerned, two coupling portions 2c suitably arranged as previously described will be present).

Likewise, the operating sequence for arranging the primary upright length 3 or the secondary upright length 5 consists of the following operations: an axial body of thermoplastic resin 3b, 5b incorporating reinforcing fibers 3a, 5a is made; a plurality of insertion seatings 3c, 5c is formed in the axial body (by drilling or punching, for example) and finally the axial body is cut to preestablished lengths to obtain a predetermined amount of primary and/or secondary upright lengths 3, 5. Suitably, as already said, the axial body is made by forming, preferably by pultrusion or extrusion.

The ladder-assembling procedure in accordance with the present invention can be advantageously organized following a line production as schematically described below.

First of all, handling of a plurality of rungs 2 aligned along a first feeding direction 6 is carried out; at the same time, upright lengths 3 and/or 5 are handled along a second feeding direction 7 which is transverse to the first feeding direction 6.

Obviously, the two feeding directions 6 and 7 are oriented relative to each other so as to have at least one crossing point, at which the coupling portions 2c of rungs 2 are associated with the engagement regions 3c and/or 5c on the upright lengths 3, 5.

In accordance with the present invention, the just described handling steps take place prior to the step of mechanically linking rungs 2 and upright lengths 3, 5; in other words, melting of the thermoplastic binding resins takes place at appropriate stations 8 disposed in the production line downstream of the stations for associating rungs 2 with the upright lengths 3 and/or 5. Conveniently, localized melting of the thermoplastic resins is carried out with apparatuses of known type such as electric furnaces or overheated gas blowers, depending on the technical/logistic requirements of the production plant.

In the light of the above description, it is to be noted that it is also an object of the present invention to provide a ladder 1 manufactured following a process in accordance with the present invention.

In particular, the ladder thus obtained has a primary upright length 3 (or a pair of parallel upright lengths or upright lengths converging from bottom to top 3 and 5) and a plurality of rungs 2, which are transversely linked to the primary upright length 3 (or to the two primary and secondary upright lengths simultaneously, depending on the selected construction embodiment).

Advantageously, rungs 2 and/or the primary upright length 3 (but also the secondary upright length 5, where present) are made of composite material having a plurality of reinforcing fibers 2a, 3a, 5a associated with a thermoplastic polymeric binding resin 2b, 3b, 5b. With reference to the rungs, as an alternative embodiment, they can be fully made of a predetermined, preferably thermoplastic material, without reinforcing fibers.

In particular, rungs 2 in the ladder in accordance with the invention have a substantially flat resting surface 2d; this resting surface 2d projects in such a manner that it is disposed in a substantially horizontal plane under use conditions of the ladder.

Still with reference to rungs 2, they have a tubular conformation, for clear reasons of stiffness and mechanical resistance; in addition, this configuration particularly lends itself to be obtained by the previously listed forming processes, to advantage of a production efficiency.

The invention achieves important advantages.

First of all, use of the thermoplastic resin in the present process enables elimination of the interconnecting element or even of adhesive layers between rung and upright length, which will bring about important benefits in terms of construction simplicity combined with a considerable structural coherence and a great stability of the rung-upright length connection.

In addition, the ladder obtained with the process of the present invention, due to use of thermoplastic resin, is free of all problems connected with decay of the resin at high temperatures; in addition, the thermoplastic properties constitute an unquestionable advantage as regards the rung-upright length link, because the present process enables the binding resin to be directly employed as the cohesive agent.

Finally, an advantage achieved by the present invention is represented by a reduction in the production costs, resulting both from the reduced overall time employed for producing the finished ladder and from simplification of the production plant and also due to the employed energy resources and material resources.

What is claimed is:

1. A process for manufacturing ladders comprising the following steps:

arranging a plurality of rungs (2) fully made of a predetermined plastic material and each having at least one coupling portion (2c);

arranging at least one primary upright length (3) made of a material comprising a plurality of reinforcing fibers (3a) associated with a binding resin (3b);

mechanically linking the coupling portions (2c) of the rungs (2) to corresponding engagement regions (3c) provided on the primary upright length (3) by bringing said binding resin (3b) to a fluid phase at least close to said corresponding engagement regions (3c), said linking step comprising a sub-step of melting by heating and mixing the predetermined plastic material of the rung (2) with the binding resin (3b) of the primary upright length (3), the binding resin (3b) forming the upright length (3) and the predetermined plastic material forming the rungs (2) being directly employed as cohesive agents and cooperatively defining, during said linking step, a randomly-shaped agglomerate directly connecting the rung (2) and the upright length (3).

2. The process as claimed in claim 1, wherein the binding resin (3b) and the predetermined plastic material are thermoplastic polymeric materials.

3. The process as claimed in claim 2, wherein the binding resin (3b) and the predetermined plastic material are chemically similar to each other.

4. The process as claimed in claim 2, wherein the binding resin (3b) and the predetermined plastic material are chemically identical substances.

5. The process as claimed in claim 1, wherein the step of mechanically linking the rungs (2) to the upright length (3) further comprises a step of consolidating the binding resin (3b) so as to create an agglomerate of solidified thermoplastic resin (5), said consolidation step coming after the step of bringing the binding resin (3b) to the fluid phase.

6. The process as claimed in claim 1, wherein the step of mechanically linking the rungs (2) to the upright length (3) further comprises the following sub-steps:

arranging a cast body (4) of thermoplastic polymeric material at said corresponding engagement regions (3c);

moving the coupling portion (2c) close to the corresponding engagement regions (3c) and in the vicinity of the cast body (4), after interposition of the cast body (4) between the said corresponding engagement region (3c) and the coupling portion (2c);

liquefying the predetermined plastic material of the rung (2) and the binding resin (3b) of the upright length and the cast body (4) to bring a predetermined amount of thermoplastic material to the a fluid phase; and causing solidification of said fluid-phase so as to obtain an agglomerate of solidified thermoplastic resin (5).

7. The process as claimed in claim 6, wherein the step of arranging the cast body (4) takes place by positioning of said cast body inside the corresponding engagement region (3c), the corresponding engagement region (3c) comprising a coupling seating formed in the upright length, the shape of the cast body (4) substantially matching that of the corresponding engagement region (3c).

8. The process as claimed in claim 6, wherein the step of arranging the cast body (4) takes place by positioning of said cast body around the coupling portion (2c), the shape of the cast body (4) substantially matching that of the coupling portion (2c).

9. mended) The process as claimed in claim 6, wherein the cast body (4) is made of a thermoplastic polymeric material, chemically similar to the binding resin (3c).

10. The process as claimed in claim 1, wherein each rung (2) has an insertion portion (2c) substantially positioned at the center line of the rung (2).

11. The process as claimed in claim 1, further comprising the following steps:

arranging a secondary upright length (5) of a material including a plurality of reinforcing fibers (5a) associated with a binding resin (5b) and having a plurality of engagement regions (5c) each designed to receive at least one coupling portion (2c) of a rung (2); and mechanically linking the rungs (2) to the secondary upright length (5), the rungs (2) having two coupling portions (2c) disposed opposite to each other and being mechanically linked to the primary upright length (3) and the secondary upright length (5) through each of the two opposite coupling portions (2c).

12. The process as claimed in claim 11, wherein the binding resin (5b) of the secondary upright length (5) is a thermoplastic polymeric material chemically similar to the binding resin (3c) and to the cast body (4).

13. The process as claimed in claim 11, wherein said secondary upright length (5) is oriented parallel to, and coplanar with the primary upright length (3).

14. The process as claimed in claim 11, wherein the secondary upright length (5) is oriented in a transverse direction converging from the ladder bottom up and coplanar with the primary upright length (3).

15. The process as claimed in claim 11, wherein the steps of arranging the primary upright length (3) and the secondary upright length (5) respectively comprise the following sub-steps:

making an axial body of thermoplastic resin (3b, 5b) incorporating reinforcing fibers (3a, 5a);

forming a plurality of engagement regions (3c, 5c) on said axial body which regions are adapted to engage the coupling portions (2c) of the rungs (2); and cutting said axial body to preestablished lengths to obtain a given amount of primary and secondary upright lengths (3, 5) each having a predetermined number of engagement regions (3b, 5b).

16. The process as claimed in claim 15, wherein the step of making the axial body is carried out by pultrusion.

17. The process as claimed in claim 1, further comprising the following sub-steps:

handling a plurality of rungs (2) aligned in a first feeding direction (6);

handling the upright lengths (4) along a second feeding direction (7) which is transverse to said first feeding direction (6) of the rungs (2); and associating the coupling portions (2c) of the rungs (2) with the engagement regions (3c, 5c) of the upright lengths (3, 5), said steps taking place before the step of mechanically linking the rungs (2) and the upright lengths (3, 5).

18. A ladder comprising at least one primary upright length (3) and a plurality of rungs (2) transversely linked to the primary upright length (3), wherein the rungs (2) and the primary upright length (3) are made of a composite material having a plurality of reinforcing fibers (2a, 3a) associated with a thermoplastic polymeric binding resin (3b), said ladder (1) being accomplished by a process according to claim 1.

19. The ladder as claimed in claim 18, wherein a predetermined number of rungs (2) has a substantially flat resting surface (2d), said resting surface (2d) being disposed in a substantially horizontal plane under use conditions of the ladder.

20. The ladder as claimed in claim 18, wherein said rung (2) has a tubular conformation.

21. A process for manufacturing ladders comprising the following steps:

arranging a plurality of rungs (2) made of a material comprising a plurality of reinforcing fibers (2a) associated with a binding resin (2b) and each having at least one coupling portion (2c);

arranging at least one primary upright length (3) made of a material comprising a plurality of reinforcing fibers (3a) associated with a binding resin (3b);

mechanically linking the coupling portions of the rungs (2) to corresponding engagement portions (3c) provided on the primary upright length (3) by bringing said binding resins (2b,3b) to the fluid phase at least close to the engagement regions (3c), said linking step comprising a sub-step of melting by heating and mixing the binding r resin (2b) of the rung (2) with the binding resin (3b) of the primary upright length (3), the binding resins (2b, 3b) being directly employed as cohesive agents and cooperatively defining, during said linking step, a randomly-shaped agglomerate directly connecting the rung (2) and the upright length (3).

22. The process as claimed in claim 21, wherein the binding resins (2b,3b) are thermoplastic polymeric materials.

23. The process as claimed in claim 21, wherein the step of arranging a rung (2) comprises the following sub-steps:

making an elongated body of thermoplastic resin (2b) incorporating reinforcing fibers (2a); and cutting said elongated body to preestablished lengths to obtain a given amount of rungs (2) each having at least one connecting portion (2c).

24. The process as claimed in claim 23, wherein the step of making the elongated body is carried out by pultrusion.

* * * * *

UNITED STATES PATENT AND TRADEMARK OFFICE
CERTIFICATE OF CORRECTION

PATENT NO.      : 6,591,942 B2                                                                   Page 1 of 1
DATED           : July 15, 2003
INVENTOR(S)     : Alfonso Branca It is certified that error appears in the above-identified patent and that said Letters Patent is hereby corrected as shown below:

<u>Column 8,</u>
Line 19, please delete "mended)".

<u>Column 10,</u>
Line 10, after "binding", please delete "r".

Signed and Sealed this

Twenty-fifth Day of November, 2003

JAMES E. ROGAN
*Director of the United States Patent and Trademark Office*